United States Patent
Czaja et al.

(10) Patent No.: US 7,672,250 B2
(45) Date of Patent: Mar. 2, 2010

(54) MULTI-CARRIER WIRELESS COMMUNICATION ACCESS TERMINAL AND DATA TRANSMISSION METHOD

(75) Inventors: Stanislaw Czaja, Cardiff, CA (US); Muhammad Afsar, San Diego, CA (US)

(73) Assignee: VIA Telecom Co., Ltd. (KY)

( * ) Notice: Subject to any disclaimer, the term of this patent is extended or adjusted under 35 U.S.C. 154(b) by 503 days.

(21) Appl. No.: 11/600,360

(22) Filed: Nov. 15, 2006

(65) Prior Publication Data
US 2007/0127516 A1 Jun. 7, 2007

Related U.S. Application Data (60) Provisional application No. 60/737,661, filed on Nov. 16, 2005.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .................. 370/252; 370/236; 370/349
(58) Field of Classification Search .................. 370/252, 370/445, 328, 338, 335; 455/434, 450
See application file for complete search history.

(56) References Cited

U.S. PATENT DOCUMENTS

| | | | |
|---|---|---|---|
| 6,859,463 B1 * | 2/2005 | Mayor et al. ................ 370/445 |
| 6,862,268 B2 * | 3/2005 | Tripathi et al. ............... 370/252 |
| 6,865,387 B2 | 3/2005 | Bucknell et al. | |
| 6,928,268 B1 * | 8/2005 | Kroner ......................... 455/69 |
| 2005/0207345 A1 | 9/2005 | Onggosanusi et al. | |
| 2005/0207441 A1 | 9/2005 | Onggosanusi et al. | |
| 2005/0213555 A1 | 9/2005 | Eyuboglu et al. | |
| 2007/0070955 A1 * | 3/2007 | Seol ............................ 370/335 |

FOREIGN PATENT DOCUMENTS

WO   WO 2005/101695   10/2005

* cited by examiner

*Primary Examiner*—Ricky Ngo
*Assistant Examiner*—David Oveissi
(74) *Attorney, Agent, or Firm*—James W. Huffman; William Boling; Joel Stevens (57) ABSTRACT

A method, apparatus, and system permits an access terminal ("AT") for a multi-carrier CDMA wireless communication system to concurrently receive data on N different-frequency carriers while restricting one or more parameters that affect data reception rate, so that limited resources of the AT will be sufficient to properly process data packets on the N carriers. The data rate controlling parameter may be "I," the number of supported H-ARQ channels for one or more of the N carriers. A relationship may be defined between the number of supported forward and/or reverse link carriers, versus the number of supported H-ARQ channels and/or other data rate controlling parameters. Messages may enable identification of AT characteristics, and configuration and/or dynamic re-configuration of AT data communication capabilities that are related to different values of N and corresponding different data rate controlling parameters.

17 Claims, 2 Drawing Sheets

MULTI-CARRIER WIRELESS COMMUNICATION ACCESS TERMINAL AND DATA TRANSMISSION METHOD

CROSS REFERENCE TO RELATED APPLICATIONS

This application claims priority under 35 USC §119(e) to U.S. Provisional Application 60/737,661 filed 16 Nov. 2005 and entitled "Multi-carrier Wireless Communication System Access Terminal and Data Transmission Method," and is related to commonly owned and copending U.S. application Ser. No. 11/202,959, filed 12 Aug. 2005 and entitled "Active Acknowledgment Source Selection," and to commonly owned and copending U.S. application Ser. No. 10/947,825, filed 23 Sep. 2004 and entitled "Tristate Requests for Flexible Packet Retransmission," which in turn claims priority to U.S. Provisional Application No. 60/506,343 filed 25 Sep. 2003 and entitled "Method and Apparatus for Enabling Early Re-Transmission of Sub-Packet 0 in a Wireless Communication System;" and all of the above-identified U.S. provisional and utility patent applications are hereby incorporated herein in their entireties by reference.

BACKGROUND

1. Field

This application generally relates to the field of wireless communication systems, and more particularly to establishing communication parameters for access terminals used in such systems.

2. Related Art

Subject matter set forth herein is applicable to wireless communication systems generally. However, it has been developed in the context of CDMA cellular telecommunication systems that provide high-speed connectivity including data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network continues to be developed to transport both voice and data at much higher speeds than were available using the first and second generation wireless networks.

Wireless Communication Standards Related to the Present Disclosure

A Third Generation Partnership Project 2 (3GPP2) has been established by industry groups for the purpose of defining specifications to transition current code-division multiple-access (CDMA) wireless networks to the third generation, which is commonly referred to as "cdma2000". The 3GPP2 is primarily concerned with defining specifications for CDMA systems such as are implemented in North America. A document specifying a somewhat different CDMA system, such as is used more commonly in Europe, may be identified as 3GPP TSG-RAN Release-5, and is hereby incorporated by reference for its teachings on CDMA systems. Also incorporated by reference is so much of 3GPP TSG-RAN Release-6 as has been made public, particularly including documents submitted in conjunction therewith and identified as R1-031268, R1-040534, and R1-040758.

As described in a document entitled "*Introduction to cdma2000 Standards for Spread Spectrum Systems*", available from the 3GPP2 in a document number C.S0001-D, published by the 3GPP2 in Feb. 2004, the "cdma2000 family of specifications" specifies a spread spectrum radio interface that uses well known Code Division Multiple Access (CDMA) wireless transmission techniques in order to meet the requirements for 3G wireless communications. The C.S0001-D document is incorporated by reference herein in its entirety. As described in the incorporated C.S0001-D reference, the cdma2000 family of standards includes specifications for the following aspects of the cdma2000 third generation wireless communication system: core air interface, minimum performance, and service standards. The cdma2000 core air interface standards are publicly available from the 3GPP2 as follows: C.S0001-D, *Introduction to cdma2000 Standards for Spread Spectrum Systems*, February 2004; C.S0002-D, *Physical Layer Standard for cdma2000 Spread Spectrum Systems*, February, 2004; C.S0003-D, *Medium Access Control (MAC) Standard for cdma2000 Spread Spectrum Systems*, February, 2004; C.S0004-D, *Signaling Link Access Control (LAC) Standard for cdma2000 Spread Spectrum systems*, February, 2004; and C.S0005-D, *Upper Layer (Layer 3) Signaling Standard for cdma2000Spread Spectrum Systems*, February, 2004. In addition, the family includes a standard that specifies analog operation, to support dual-mode mobile stations and base stations. This standard is publicly available from the 3GPP2 as document number C.S0006-D, *Analog Signaling Standard for cdma2000 Spread Spectrum Systems*, February, 2004. All of the above standards are collectively referred to herein as the "cdma2000 family of standards", and are hereby incorporated herein as though set forth in full for their teachings on cdma2000 standards.

The cdma2000 family of standards allows seamless evolution from cdma2000 1x systems to cdma2000 "1xEV-DO" (1x Evolution, Data Only or Data-Optimized") and CDMA2000 1xEV-DV (1x Evolution, Data and Voice) systems. The first phase of cdma2000, cdma2000 1x systems enabled operators with existing IS-95 systems to double overall system capacity. These systems offer 3G type services at speeds up to 140 kbps peak data rate while occupying a very small amount of frequency spectrum (1.25 MHz per carrier). The cdma2000 1x systems are designed for increased voice capacity and support "always-on" data transmission of approximately 153.6 kbps on both the forward and reverse links. The cdma2000 1x systems were first deployed in October, 2000.

In 2004, the cdma2000 1xEV-DO Revision A (or "RevA") specification was approved by the 3GPP2 Technical Specification Group. Revision A is optimized for packet data service, and supports peak data rates of 3.1 Mbps on the forward link and up to 1.8 Mbps on the reverse link. The high data rates on the reverse link and low data latency enable operators to deliver rich multimedia services, such as video telephony, and enhance user experience. Revision A is an enhanced version of 1xEV-DO Release 0 (or "Rev0"), which delivers up to 2.4 Mbps data speeds and has been commercially deployed since 2002. These systems are also referred to by the 3GPP2 as High Rate Packet Data systems, or "HRPD" systems, in the developing cdma2000 family of standards. Standards defining these HRPD systems are available from the 3GPP2.

For example, the standard defining the 1xEV-DO Rev0 HRPD system is set forth in 3GPP2 document number C.S0024-0 (Versions "V 2.0", "V 3.0" and "V4.0") entitled *cdma2000 High Rate Packet Data Air Interface Specification*, dated Oct. 27, 2000 (for Version V 2.0), Dec. 5, 2001 (for Version V 3.0), and Oct. 25, 2002 (for Version V 4.0). The standard defining the 1xEV-DO RevA HRPD system is set forth in 3GPP2 document number C.S0024-A (Versions 1.0 and 2.0, dated March 2004 and July 2005, respectively), also entitled "*cdma2000 High Rate Packet Data Air Interface Specification*". Both of these standards include technical requirements for providing compatibility with cdma2000 HRPD systems. These standards set forth technical requirements that ensure that a compliant Access Terminal ("AT") can obtain service through any access network that conforms to the standards. All of the HRPD air interface specifications set forth above are hereby incorporated by reference herein as though set forth in full.

In addition to the HRPD standards cited above, 3GPP2 document numbers A.S0007-0 (version V 1.0), A.S0007-0 (version V 2.0), A.S0007-A (versions V 1.0 and V 2.0) and A.S0008-0 (version V 3.0) all describe an inter-operability specification for a Radio Access Network (RAN) that supports HRPD. These specifications contain message procedures and formats necessary to obtain interoperability. Document numbers A.S0007-A (version V 2.0), entitled *Interoperability Specification (IOS) for High Rate Packet Data (HRPD) Access Network Interfaces—Rev A, Revision A (Post SDO Ballot, Pre-SDO Publication Version)*, dated May, 2003 (TIA-1878), and A.S0008-0 (Version V 3.0), entitled *Interoperability Specification (IOS) for High Rate Packet Data (HRPD) Access Network Interfaces—Revision 0 (Post SDO Ballot, Pre-SDO Publication Version)*, dated May 2003, (TIA-878-1) supersede the standards noted above. All of the HRPD interoperability specifications set forth above are hereby incorporated by reference herein as though set forth in full.

The specification that is the most relevant to the advances set forth herein may be identified as either 1xEV-DO Rel. B, and the same specification may also be identified as IS-856-Rel. B. This specification, however nominated, and other standards related to cdma2000 compatible HRPD systems, should be publicly available from the 3GPP2, and are all incorporated by reference herein in their entireties. 3GPP2 document number C.S0054-0, Version V 2.0, entitled *CDMA2000 High Rate Broadcast-Multicast Packet Data Air Interface Specification*, dated July, 2005, sets forth technical requirements that form the compatibility standard for cdma2000 broadcast high rate packet data systems. These technical requirements ensure that a compliant access terminal (AT) can obtain service through any access network conforming to the standard. The C.S0054-0, Version V 2.0 document is also hereby incorporated by reference herein as though set forth in full.

As is well known, the use of automatic retransmission protocols that operate within a "physical" communication layer, such as the Hybrid Automatic Retransmission reQuest (H-ARQ) protocols, may enhance the efficiency of wireless data transmissions such as those defined by the HRPD specifications cited above. When a transmitting station (TS) transmits a packet to a receiving station (RS), H-ARQ procedures generally require the RS to promptly transmit an acknowledgment signal back to the TS to indicate whether the packet transmission was successful (ACK) or not (NACK). It is well known that H-ARQ protocols may provide significant gains when operating packet data channels.

Problems Associated with to the Present Rev0 and RevA HRPD Systems

The 1xEV-DO Rev0 and RevA HRPD systems cited above may be referred to as "1x" systems, because they only support a single 1.25 MHz carrier. The 3GPP2 is currently developing standards for an evolved HRPD system that will be capable of supporting multiple carriers. The evolved HRPD system, sometimes referred to as an NxEV-DO system, and referred to herein as an "HRPD RevB" or "Nx HRPD" system (as contrasted with the HRPD RevA system defined by the above-incorporated 1xEV-DO RevA HRPD standard), can operate using multiple carriers, each occupying a different frequency spectrum (e.g., a number "N" of 1.25 MHz carriers). The HRPD RevB system is therefore referred to as an "Nx system" to indicate that it supports multiple different-frequency carriers. Presently, the 3GPP2 is defining the RevB system to support between 1 and 15 1.25 MHz carriers. When a RevB system (also referred to as an "NxDO" system) device is operated in an N=1 (i.e., "1x") mode, it defaults to RevA functionality (i.e., it must be compatible with the above-incorporated RevA HRPD standards).

One of the benefits provided by the HRPD RevB Nx systems is an ability to process forward links and/or reverse links on each of N carriers and, as a result, increase system peak data rates by a factor of "N". Additional benefits provided by the Nx HRPD systems are made possible, for example, due to the operations of the Nx scheduler. In Nx HRPD systems, the scheduler can be used to exploit frequency selectivity, relative carrier loading, etc. The Nx scheduler can schedule an optimal data rate/user on each of the supported carriers and, as a consequence, increase overall system throughput, decrease latency for a particular application, and improve overall user experience.

However, the benefits provided by the Nx HRPD (also referred to herein as HRPD RevB) systems come at some cost. In general, system complexity and costs increase with an increase in the number "N" of carriers supported by the HRPD RevB systems. More specifically, the Access Terminal (AT) becomes increasingly more complex and costly as "N" increases. This increase in system complexity grows more or less linearly with the number of carriers "N" supported by the system.

Therefore, a need exists for a method and apparatus providing Nx carrier support without incurring all the burdens of complexity and cost that are presently entailed by such Nx carrier support. Such a method or apparatus should allow specific 3G applications and services to benefit from the features and functions permitted by Nx HRPD systems, yet permit implementation using multi-carrier wireless communication system Access Terminals (ATs) that have reduced hardware requirements compared to present solutions. Such multi-carrier communication system ATs should ideally be relatively inexpensive to manufacture, yet permit flexible, reconfigurable operation to make efficient use of the hardware resources provided in the ATs.

The methods and apparatus described herein address the above-described problems and goals, and alleviate other difficulties as well.

SUMMARY

A method, apparatus, and system are disclosed that enable an Access Terminal ("AT") capable of multiple carrier (Nx HRPD) operation in a 3G CDMA wireless communications system to be implemented with reduced hardware requirements, reduced complexity, and/or with increased flexibility of resource allocation for Nx operation, as compared to an AT implemented in accordance with prior art methods or apparatus. The AT will support data reception from a Base Station (BS) concurrently on N different carriers (N>1); however, it may limit throughput and/or data-rate capacity on one or more of the N carriers so that data communications can proceed efficiently in view of the hardware resource limits of the AT. Buffer memory is an example of an AT hardware resource that may be too limited to permit maximum-rate data communications on all N carriers. Many different restrictions may be imposed to limit throughput and/or data rates so as to avoid running out of a limited resource (e.g., buffer memory), but in a preferred embodiment, reception may be suspended on one or more of a plurality of interlaced Hybrid Acknowledgment Retransmission reQuest (H-ARQ) channels, for one or more of the N carriers. Moreover, values for N, and for one or more other relevant parameters such as the number of supported H-ARQ channels, may be communicated to the BS in an appropriate message, and may be dynamically reconfigurable. Thereby, as circumstances change, tradeoffs can be made to permit efficient use of the hardware resources of the AT, such as buffer memory, while communicating concurrently via a plurality of carriers. Consequently, a relatively simple and modestly provisioned AT may be configured to provide at least some of the benefits associated with plural-carrier (Nx) data communications.

One embodiment is a method of establishing parameters to govern CDMA data communications between a BS and an AT. The method includes determining values for n and rp for a particular AT, where n is a number of different-frequency carriers on which the AT is configured to concurrently receive data, and rp is another parameter that limits a data reception rate on at least one of the n carriers. The method also includes communicating to the BS the values of n and rp currently determined for the AT, and consequently receiving data from the BS at the AT on no more than n different-frequency carriers and at a rate limited by rp, such that an AT hardware resource that would be inadequate for proper operation for at least one other selectable value of rp is adequate with the determined value of rp. Appropriate values of n and rp may be dynamically reconfigurable, may be determined by the AT, and/or may vary based on other factors affecting data rates on particular carriers, such as the modulation and coding techniques that are then permitted. The parameter rp may represent, for from one to all of the n carriers, a number of interleaved H-ARQ channels within which data packets may be communicated between the BS and the AT.

Another embodiment is a method of balancing resource allocation in an AT that includes selecting a number n of carriers for data communications between the AT and a BS. The method also includes identifying a limited resource of the AT whose usage depends on n and on other reception parameters rp(k), and determining an appropriate value x1 for a first rp(1). A value x1 is appropriate if the limited resource is sufficient for data communications on all n carriers for rp(1) =x1, but would be insufficient if rp(1) were set to a value x2, as may happen under some circumstances. The method includes communicating the appropriate values for n and rp(1) to the BS to serve as limits on those parameters for data communications between the AT and the BS. It may be required that new values of n and rp(1) be subsequently determined and communicated to the BS. The parameter rp(1) may constrain a rate of packet data communication, and may in particular specify a limit on a number of time-division multiplexed H-ARQ channels on which data packets will be communicated between the AT and the BS on one, some, or all of the n carriers. The limited AT resource may be required to be buffer memory, and the AT may be required to perform the steps of this method.

A further embodiment is a transceiver apparatus operable as a CDMA AT to concurrently receive data packets from a BS via n>1 carriers in non-overlapping frequency bands. When operating, the transceiver includes a reception parameter rp that is settable to a plurality of different selectable values, and which affects a maximum rate of data communication between the AT and the BS on at least one carrier. It also includes a data processing resource that is needed in a quantity that is a function of n and rp for proper data packet communication between the AT and the BS, as well as a resource balancing module. The resource balancing module is configured to accept a value for one of n and rp, and to determine a value for the other of n and rp such that data packets may be properly communicated between the AT and the BS using n and rp without requiring more of the data processing resource than is available within the AT. The transceiver may, when operating, further be required to include a messaging module configured to communicate the determined values of n and rp to the BS. The data processing resource may be required to be available buffer memory, or may be another resource. The parameter rp may be required to specify one of a maximum coding rate, a maximum-rate modulation scheme, and a number of interlaced H-ARQ channels on which data packets may be communicated between the AT and the BS, or it may be required to be the number of H-ARQ channels to be used, whether for one carrier, or for more carriers, or for all n carriers.

DETAILED DESCRIPTION

The inventors have observed that most of the practical applications that will benefit from multi-carrier data communication in HRPD RevB systems may not require the maximum peak data rate provided by simple concatenation of the full capacities of several RF carriers. Many devices targeted for specific applications, such as "Voice over IP" (VoIP), Video Telephony, etc., do not require extremely high peak data rates, yet still may benefit from the other features and functions enabled by CDMA communication over a plurality of different-frequency carriers.

Figure 1:
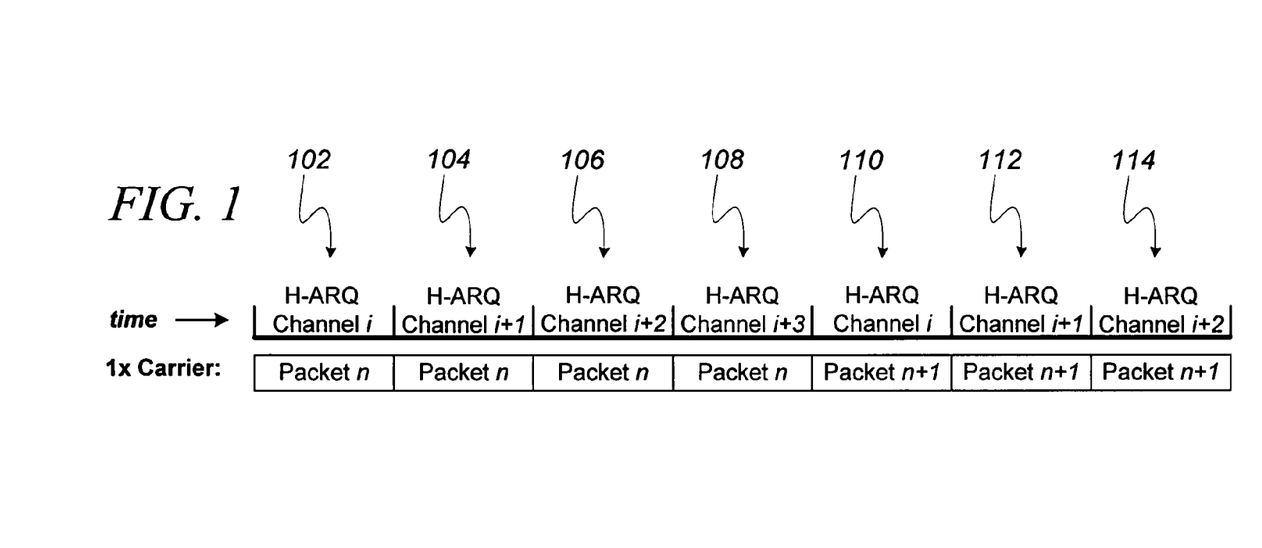
FIG. 1 is a simplified diagram showing the basic H-ARQ single carrier 1xEV-DO Forward Link Interlace channel structure.

FIG. 1 is a simplified diagram showing the basic H-ARQ single carrier 1xEV-DO Forward Link Interlace channel structure. As shown in FIG. 1, four (4) H-ARQ channels i, i+1, i+2 and i+3 are "interlaced" to provide ARQ timing in which successive sub-packets for a given H-ARQ channel are transmitted at fixed intervals. For each H-ARQ channel, this timing enables the reception status of one subpacket to be reported (ACK or NACK) to the transmitting station before the next packet for that channel must be sent. Each subpacket n+1 may be new, or may be a partial or complete retransmission of the preceding subpacket n on that particular H-ARQ channel. Which of these should be sent must be determined by the data source transmitter in accordance with the ACK feedback status provided from the receiving station. The delay between subpacket n and subpacket n+1 on a given H-ARQ channel, illustrated in FIG. 3 as three slot durations, is sufficient to permit the receiving station to determine the appropriate ACK status for subpacket n, to convey that status to the transmitting station, and for the transmitting station to select the appropriate subpacket n+1 in response to the ACK status. Thereby, for H-ARQ channel i, subpacket n in slot 102 is followed by subpacket n+1 in slot 110, which may, for example, be a retransmission of subpacket n if acknowledgment was negative (NACK). Physical layer data packets are typically distributed among successive sub-packets on a given H-ARQ channel.

Subpacket n of H-ARQ channel i is transmitted during a slot 102. During a next slot, 104, subpacket n of a second H-ARQ channel i+1 is transmitted. Subpacket n of H-ARQ channel i+2 is transmitted during a next slot 106, and subpacket n for the last H-ARQ channel i+3 is transmitted during a next slot 108. The subpackets of each H-ARQ channel are generally independent of subpackets of each other H-ARQ channel. At a slot 110, the next subpacket (n+1) of H-ARQ channel i is transmitted. Similarly, the n+1 subpackets for H-ARQ channels i+1 and i+2 are transmitted during slots 112 and 114, respectively. Thus, the different H-ARQ channels are "interlaced" with each other.

Forward link (FL) traffic transmitted as data packets from a Base Station (BS) to an Access Terminal (AT) receiver is described first. Each of the H-ARQ channels illustrated in FIG. 1 is generally transmitting independent data packets. During each successive interlace period shown in FIG. 1, the receiver AT must store and process all data that it receives on the forward link (FL) traffic channel. The receiver AT must store data representing the signals that it receives during each slot until it can determine that the data represented by the signals has been correctly received. For some communication protocols this may require retaining raw signal data until a number of successive subpackets have been sent. Once the data represented by a subpacket has been correctly received, the data must be retained and concatenated with subsequent subpacket data until accurate reception of the entire packet is confirmed. The receiver AT must thus store a large amount of data.

As defined in the 1xEV-DO RevA standard (previously incorporated by reference), the AT receiver must support all four interlaces in order to provide a maximum peak data rate of 3.1 Mbps. The maximum packet size on the FL for HRPD RevA systems comprises 6144 symbols; in order to support this requirement, the terminal receiver symbol memory is as follows:

Symbol_Buffer=4 interlaces*6144 symbols*8 bit/symbol=196,608 bits.

A similar requirement exists on the Reverse Link (RL). On the RL, the terminal must support three interlaced H-ARQ channels with maximum packet sizes of 12288 bits and a maximum transmit data rate of 1.8 Mbps.

Figure 2:
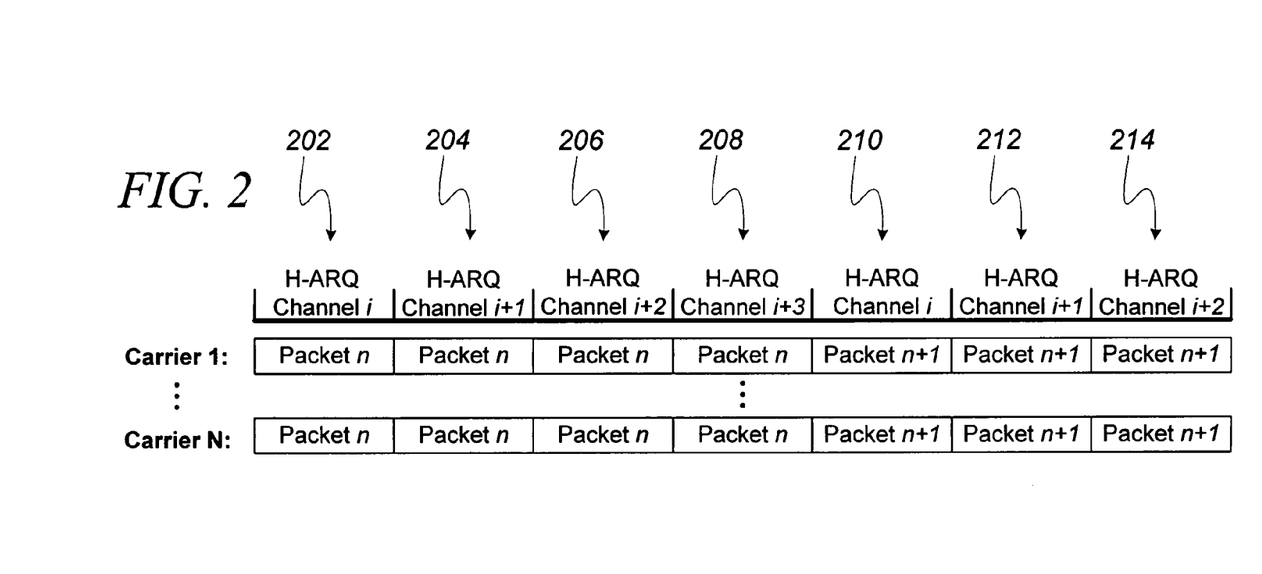
FIG. 2 is a simplified diagram showing the basic H-ARQ multiple carrier NxEV-DO (or HRPD RevB) Forward Link Interlace channel structure.

FIG. 2 illustrates a basic FL H-ARQ Interlace channel structure for multiple carrier NxEV-DO (or HRPD RevB) CDMA packet data communication. As shown in FIG. 2, the terminal receives data on each interlace up to the maximum packet size/rate on each of the N different-frequency carriers that it supports. For each of N carriers, during successive slots 202, 204, 206 and 208, the four H-ARQ channels i to i+3 (described with respect to FIG. 1) each receive their nth subpacket. During the next successive slots 210, 212 and 214, the first three H-ARQ channels receive subpackets n+1, and this process continues for all of the interlaced H-ARQ channels on each of the N carriers.

As should be apparent from comparing FIG. 2 to FIG. 1, the data that must be received, stored, and processed by the terminal increases linearly with an increase in N. For example, with N=4, the data rate provided to the terminal is greater than 12 mbps on the FL and 7 mbps on the RL. More than 835 kbits of symbol memory is therefore required to support NxEV-DO operation for N=4, according to the standards that were proposed or adopted prior to the advances described herein.

As noted above, most practical applications do not require the very high peak data rates provided by the developing HRPD RevB systems. Consequently, in many practical applications, the high costs associated with previously proposed HRPD RevA and RevB ATs are not justified. However, it will be useful to enable an AT to obtain some of the benefits of NxEV-DO systems without incurring all of the costs and complexity entailed by previous proposals for such systems. The method and apparatus described herein permit an AT having reduced cost and complexity, and consequently having resources too limited to support multi-carrier HRPD operation as previously proposed, to support some features of multi-carrier operation by trading off other features in a new manner. The result is a system that can flexibly support ATs with a variety of different multi-carrier capabilities. Indeed, the tradeoffs can be made dynamically configurable so that an AT can efficiently redeploy limited resources as conditions change.

In order to achieve this goal, in some embodiments a set of parameters are used to separately select, or define a relationship between, (a) the number of supported FL or RL carriers, and (b) another parameter that can be constrained to reduce the quantity of a particular limited resource. In a particular preferred example, the limited resource is memory, particularly symbol memory, and the number of interlaced H-ARQ channels to be supported for a carrier is the other parameter. A set of messages is also defined to convey values of such parameter sets for associated ATs. Such messages need not be communicated only at call set-up, but may allow dynamic reconfiguration of the ATs as needed.

Figure 3:
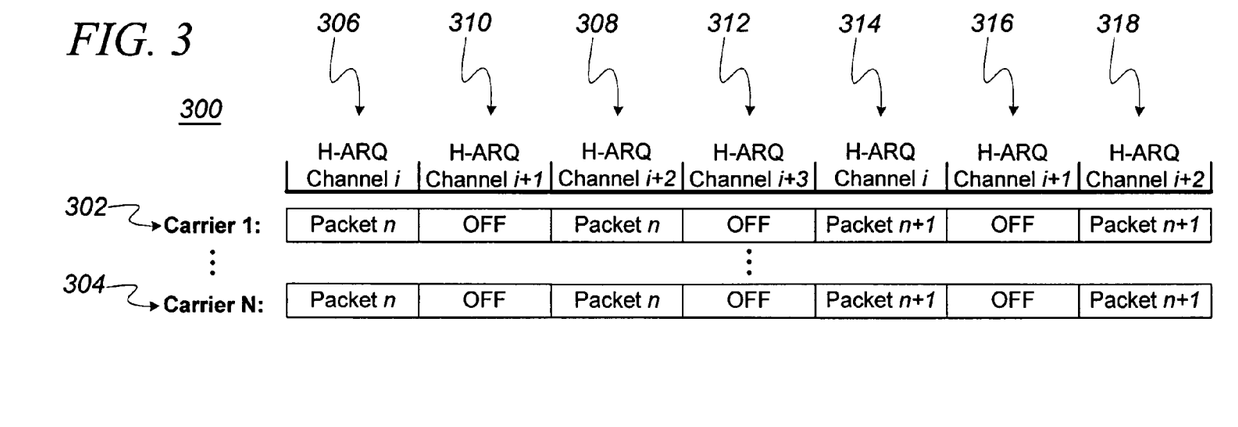
FIG. 3 shows an exemplary H-ARQ multiple carrier Forward Link Interlace channel structure in accordance with the present teachings, wherein the number of FL carriers N=2, supporting only 2 Interlaces (I=2).

FIG. 3 shows an exemplary H-ARQ multiple carrier Forward Link Interlace channel structure 300 in accordance with the present teachings. H-ARQ subpacket support is shown for a first supported carrier, Carrier 1 302, and for an Nth supported carrier, Carrier N 304, during seven slots as indicated by reference numbers 306-318. Only H-ARQ channels i and i+2 are supported for each of the illustrated carriers; thus, each illustrated carrier supports two interlaces (I=2). "I" is, in this case, a parameter that indicates the number of supported H-ARQ interlaces for each supported channel. For the illustrated FL, the maximum value of I=4. By changing I from a maximum selectable value, 4, to a constrained value, 2, for each supported carrier, the total amount of symbol memory required is reduced by about half. Thus, if an AT has symbol memory resources that are too limited to support all four possible H-ARQ interlaces for all N supported carriers, a reduced value of I may be selected that permits N carriers to be supported using only the limited symbol memory resource of the AT. ATs designed in accordance with such a configuration will be compatible with both HRPD RevA and RevB systems, yet will not require so much symbol memory as would previously have been required.

If FIG. 3 were consistent with previous proposals for Nx operation, then all of the H-ARQ channels would receive subpackets for each of the N supported carriers, including H-ARQ channels i+1 and i+3, which would receive subpackets during the indicated slots 310, 312 and 316. FIG. 3 illustrates one alternative for disabling some H-ARQ channels: each of the N carriers is enabled to receive on only I H-ARQ channels. However, if simplicity is not essential, I need not have the same value for each carrier, but may have a value independently determined for each carrier. Thus, there may be N values of I, referenced as values $I_1$-$I_N$. Moreover, the same H-ARQ channels need not be enabled in respect of each carrier, except to enhance simplicity. Not only the number of supported H-ARQ channels may be independently determined for each carrier, but which particular H-ARQ channels are enabled may also be independently determined for each carrier. In that case, the N variables $I_1$-$I_N$ become vectors $I_1$-$I_N$ that include information as to exactly which H-ARQ channels are enabled for each of the N supported carriers.

It should be noted that other resources, besides symbol memory, and other performance parameters besides "I" may be traded off. Examples of other limited AT resources that may be accommodated by adjustment of a performance parameter, besides memory, include Turbo decoder performance capacity and/or other signal processing resources. Total transmit power capacity may be an example of a limiting resource for transmission purposes. Examples of other performance parameters that may be constrained to enable N-carrier communication in view of a limiting resource include: modulation scheme, coding rate, other data-rate factors, and H-ARQ channel assignment versus carrier. Although the supported interlaces value "I" applied, above, to all N supported carriers, an independent value of I may instead be provided for each supported carrier.

Figure 4:
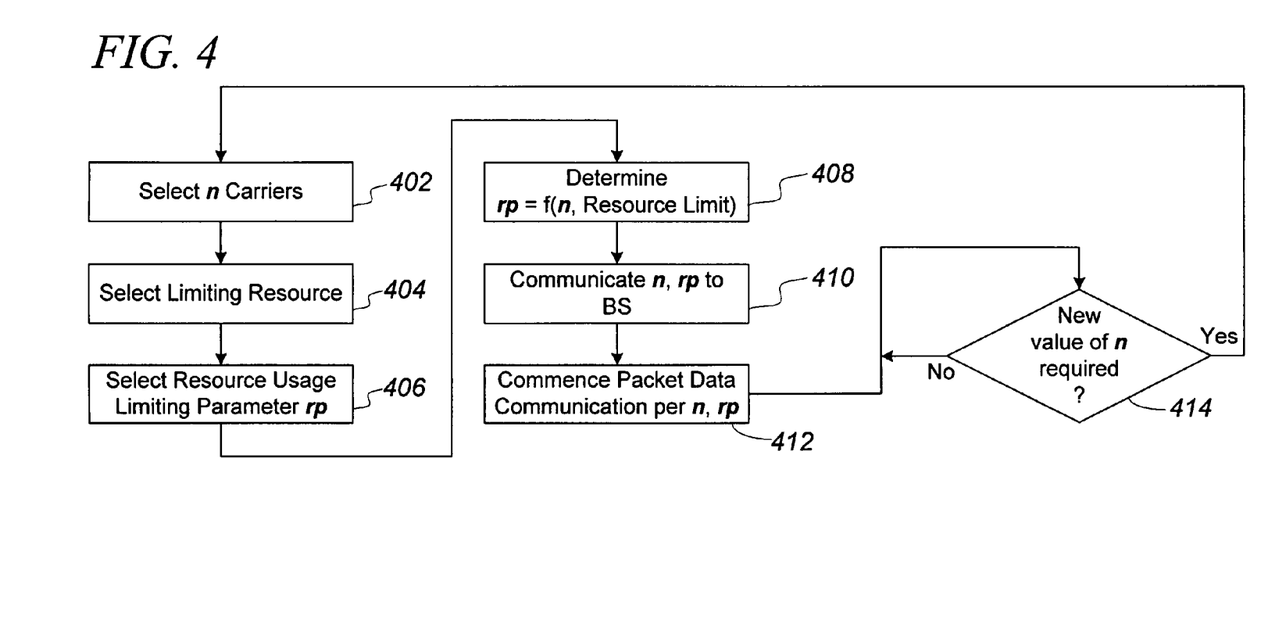
FIG. 4 is a flow chart of method steps by which an Access Terminal constrained by a resource limitation can flexibly effect multi-carrier packet data communications with a Base Station.

FIG. 4 illustrates a general method for enabling multi-carrier operation between BSs and ATs that are constrained by one or more limited resources. The case when the number of carriers to be supported is selected first is illustrated; the converse situation is described thereafter. The method may begin at a block 402, where a number of carriers to be supported is selected, designated as parameter n. Proceeding to a block 404, a limiting resource is selected, either explicitly, if the system is flexible enough to accommodate different limiting resources, or implicitly, if the limiting resource is simply presumed. The available quantity of symbol memory is a good example of a limiting resource that may be accommodated by the method of FIG. 4. Proceeding to a block 406, a parameter is selected that may be varied to limit usage of the limiting resource. For example, rp may indicate the number of H-ARQ channel interlaces that will be supported on one or more carriers.

The method may then proceed to a block 408, in which an appropriate value for rp is calculated. Given the "Resource Limit" value of the limited resource, in the block 408 the parameter rp may be found as a function of the Resource Limit and of n. For example, given an available symbol memory size S and a symbol memory requirement R for each H-ARQ channel, if rp is the number of H-ARQ interlaces to be supported it may be determined as rp<=S/R/n.

The value for rp may simply truncate any remainder of the calculation S/R/n, and may then be used for all n carriers. However, a fractional remainder of the memory capacity may be usefully employed by increasing rp for one or more of the n supported carriers, thus increasing data throughput somewhat. Innumerable other methods for implementing the calculation of block 408 are possible, and a skilled person will readily determined a calculation appropriate for the particular circumstances.

Returning to FIG. 4, in a block 410 the determined values for n and rp may be communicated to the serving Base Station (BS). The communication may employ a Capability Message, such as set forth in more detail below. The BS may then transmit and/or receive data packets to or from the AT in accordance with the determined values of n and rp. The limiting resource will be sufficient for such communication if the calculation of block 408 has been properly made. Finally, the system may be made flexibly responsive to changes, whether in the number of carriers to be supported, or in channel capacity conditions, or otherwise. In a block 414, the conditions that might affect the needed value for n are observed, and changes may indicate a need to select a new value for n. If yes, the method would proceed to the block 402. If no, then the method repeats the step(s) of the block 414.

FIG. 4, as described above, illustrates a method in which a number n of carriers that are to be supported is selected first. Based on that selection, a corresponding parameter rp is selected so that the n carriers can be supported despite some particular resource limit. The method of FIG. 4 may be performed iteratively for each of a plurality of different limiting resources, and/or for a plurality of different supported carriers.

The method of FIG. 4, as described above, may be further generalized by reversing n and rp, such that a number n of carriers that can be supported is determined as a function of a limiting resource in combination with a selected limiting parameter rp. According to such a reversal, the various blocks would be redefined as follows: at block 402, a desirable parameter rp is selected for influencing resource usage (such as the number "I" of supported H-ARQ interlaces per carrier). At block 404, the limiting resource (such as available symbol memory) is selected. At block 406, a resource usage-affecting parameter for which a value is to be determined (such as the number n of carriers to be supported) is selected. At block 408, calculations would determine a value for the resource usage-affecting parameter: for example, finding n=f(rp, Resource Limit). Blocks 410 and 412 are unchanged, but block 414 would test whether a new value of rp is desired.

Configuration Capability Message:

As noted above, a set of parameters and messages may be defined to implement a reduced complexity and/or reduced cost Access Terminal (AT). For example, a "Configuration Capability Message" may be transmitted by the AT during an initiation of a session. In one exemplary embodiment, the Configuration Capability Message has the format shown below in Table 1:

TABLE 1

Configuration Capability Message

| Field | Length (bits) |
|---|---|
| MessageID | 8 |
| TransactionID | 8 |
| NumberFLCarriers | 4 |
| NumberFLInterlaces | 4 |
| NumberRLCarriers | 4 |
| NumberRLInterlaces | 4 |

In one exemplary embodiment, the fields set forth in Table 1 above are defined as follows:

| | |
|---|---|
| MessageID | ID of the message. |
| TransactionID | The sender shall increment this value for each new ConfigurationCapability message that is sent. |
| NumberFLCarriers | Indicates the number of forward link RF carriers the terminal can support. This number can range from 0 to 15. |
| NumberFLInterlaces | Indicates the number of forward link interlaces the terminal can support. This number can range from 1 to 4. |
| NumberRLCarriers | Indicates the number of reverse link RF carriers the terminal can support. This number can range |

-continued

| | from 0 to 15. |
|---|---|
| NumberRLInterlaces | Indicates the number of reverse link interlaces the terminal can support. This number can range from 1 to 3. |

Capability Change Message:

The Capability Change Message may be transmitted by the access terminal when the session is active and when the terminal needs to modify its configuration. In one exemplary embodiment, the Capability Change Message has the format shown below in Table 2:

TABLE 2

Capability Change Message

| Field | Length (bits) |
|---|---|
| MessageID | 8 |
| TransactionID | 8 |
| NumberFLCarriers | 4 |
| NumberFLInterlaces | 4 |
| NumberRLCarriers | 4 |
| NumberRLInterlaces | 4 |

In one exemplary embodiment, the fields set forth in Table 2 above are defined as follows:

| MessageID | ID of the message. |
|---|---|
| TransactionID | The sender shall increment this value for each new Capability Change Message that is transmitted. |
| NumberFLCarriers | Indicates the number of forward link RF carriers the terminal can support. This number can range from 0 to 15. |
| NumberFLInterlaces | Indicates the number of forward link interlaces the terminal can support. This number can range from 1 to 4. |
| NumberRLCarriers | Indicates the number of reverse link RF carriers the terminal can support. This number can range from 0 to 15. |
| NumberRLInterlaces | Indicates the number of reverse link interlaces the terminal can support. This number can range from 1 to 3. |

The configuration capability message and capability change message may, as illustrated, be substantially identical to each other in form, but they need not be. Any reasonable technique may be used to communicate the required parameters. Additionally or alternatively, data-rate constraints other than the number of supported H-ARQ channels may be made configurable to accommodate multi-carrier operation of an AT having one or more limiting resources. Such data-rate constraints may be communicated by ordinary protocols that are typically used for setting such parameters. Modulation scheme and coding rate, for example, are varied in many situations in response to changing conditions, such as channel quality or signal strength, and ordinary protocols exist for conveying such changes.

Alternatively, a special message may be used to set a "global" limit on values for such parameters. Such global limits may serve as a final value limit that is imposed on the corresponding parameters irrespective of other calculations. Thereby, ordinary processing and modification of such parameters may proceed normally, independent of such selectable overall or "global" limits. An appropriate message may be analogous to the messages described above, with additional fields for conveying global limits on additional data-rate constraining parameters.

The message(s) used to set up and/or change the configuration may be made more complex. For example, rather than a single parameter for Number of FLInterlaces, each message may include a separate value for each supported carrier. Alternatively, capability change messages may be modified to apply to only one carrier at a time. For example, each change message may identify not a number of FLCarriers, but rather a particular FLCarrier number, and similarly identify a particular RLCarrier number rather than a number of RLCarriers. According to such alternative, a separate change message would be communicated for each carrier whose configuration is to be changed. Innumerable further messaging alternatives may be readily developed to achieve a desired level of AT flexibility or simplicity.

Access Terminal Apparatus

An AT embodiment need comprise only conventional hardware, but must have certain performance capabilities when operating. Thus, the AT may be defined by the presence, when operating, of parameters, resources, and functional "modules" that comprise hardware and software sufficient to implement required features. The art of manufacturing CDMA wireless transceivers is well understood, and will continue to develop into the foreseeable future. As such, persons skilled in this art are readily able to design and fabricate ATs that coordinate various hardware features under software or firmware control to establish any practical, functional module that is desired. Thus, the implementations of particular modules, resources, and parameters need not be restricted, but rather an AT should be defined as an embodiment according to the functions it is designed, as an operating whole, to perform or facilitate.

An AT embodiment must be able to communicate data concurrently on a plurality n of different-frequency carriers, using CDMA protocols for the data communications. Aside from the parameter n, the AT must include at least one other parameter, which may be designated rp without loss of generality. In some embodiments, a value taken on by the rp parameter must affect a maximum rate for data communicated between the AT and a Base Station (BS) on at least one carrier. For example, rp may indicate a number "I" of H-ARQ interlaced channels that will be supported on one or more of the n currently-supported carriers. Reducing the number of supported H-ARQ channels for any particular supported carrier reduces the maximum data rate on such carrier, other aspects being equal, and thus reduces the amount of certain AT resources needed to correctly process data on that carrier. Symbol memory buffer is an example of a data processing resource that is needed for proper communication between the AT and a BS. Setting rp to reflect a lower value for "I" enables more carriers to be concurrently supported by the limited resource of interest (e.g., symbol buffer) that is available. Many embodiments of such an AT will require a balancing module to determine an appropriate value for rp as a function of a given value of n and the availability of the limited resource, or to determine an appropriate value of n for a given value of rp and a limiting resource size.

In some embodiments, the parameter rp may reflect constraints on data rate other than a number of H-ARQ interlace channels supported. For example, coding rate, modulation scheme, and other CDMA characteristics, may be constrained to reduce the maximum data rate, thereby reducing some of the need for certain limited resources. A plurality of different limitations may be placed on data rate, such as a combination of coding rate, modulation scheme and "I" together. The limitations on data rate may be selected to apply to one carrier, to a plurality of carriers, or to all n currently-supported carriers.

Many embodiments of an AT consistent with the description above will benefit from additional features. For example, the AT may be required to include a messaging module configured to communicate values of n and rp to the BS. A configuration capability message, and/or a configuration change message, as described above, may be required as part of such a messaging module. Such messaging can be used to permit dynamically adaptive reconfiguration, thus taking optimal advantage of the limited-availability resource.

CONCLUSION

The foregoing description illustrates exemplary implementations, and novel features, of a method, apparatus, or system that permits implementation of a reduced complexity access terminal (AT) for use in a 3G wireless communications system. The AT may support N carriers; however, it may selectively decline to support a maximum possible data rate on some or all of the supported carriers. For example, the AT may be configured to receive data transmitted on only some of the available H-ARQ interlaces. Such data rate constriction may be imposed on one, some, or all supported carriers simultaneously. The data rate constriction will permit the AT to support N carriers concurrently, thereby enabling multi-carrier support despite having limitations on certain resources needed for the data communication. An AT having such limited resources will in general by less complex and less expensive than an AT that has sufficient resources for full-speed operation on all N supported carriers concurrently. In particular, symbol memory requirements are reduced for such ATs.

While the above description has pointed out novel features of the invention as applied to various embodiments, the skilled person will understand that various omissions, substitutions, and changes in the form and details of the methods and systems illustrated may be made without departing from the scope of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention may properly be defined only by the appended claims, rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

The invention claimed is:

1. A method of establishing data communication parameters to govern wireless data communications between a CDMA Base Station (BS) and an Access Terminal (AT), the method comprising:
   a) the AT determining values for variables n and rp corresponding to a particular AT, where n is a maximum number of different-frequency carriers on which the AT is configured to concurrently receive data, and rp is a different, additional data reception parameter that limits a rate at which the AT is configured to receive data on at least one of the n carriers, wherein said determining is performed based on an AT hardware resource which is able to communicate using the determined values for the variables n and rp, and said determining is not able to communicate using different selectable values for the variables n and rp;
   b) the AT communicating the currently determined values of n and rp for the particular AT to the BS; and
   c) the AT consequently communicating data with the BS on no more than n carriers, and at a rate limited by rp.

2. The method of claim 1, wherein the values for n and rp for the AT are dynamically reconfigurable.

3. The method of claim 1, wherein the values for n and/or rp vary based on changes in coding and/or modulation techniques that are currently permitted for communication between the BS and the AT.

4. The method of claim 1, wherein rp indicates a maximum data rate for one or more of the n frequency bands receivable by the AT.

5. The method of claim 4, wherein the rp parameter indicates a same maximum number of H-ARQ data channels for each of the n frequency channels that are currently allowed.

6. The method of claim 1, wherein the rp parameter indicates a maximum number of H-ARQ data channels, within at least one of the n frequency channels, on which data packets can be communicated between the BS and the AT.

7. A method of balancing resource allocation in an Access Terminal (AT), comprising:
   a) the AT selecting a value n>1 of different-frequency carriers on which signals representing data packets are to be communicated between the AT and a Base Station (BS);
   b) the AT identifying a limited resource provided within the AT, usage of which is based on n and also on one or more other reception parameters rp(k);
   c) the AT determining a value x1 for a first such reception parameter rp(1) such that the identified limited resource is sufficient for data communication on all n carriers when rp(1)=x1, and when rp(1) is set to an alternative value x2, the identified limited resource is insufficient, wherein rp(1) is settable to x2 under some circumstances; and
   d) the AT communicating the n and rp(1) values for the AT to the BS as limits on the n and rp(1) parameters, respectively, for data communications between the BS and the AT.

8. The method of claim 7, wherein after values for n and rp(1) have been communicated to the BS for use with the AT, a different value of n and a corresponding different value of rp(1) are subsequently determined and communicated to the BS for use with the AT.

9. The method of claim 7, wherein rp(1) constrains a rate of packet data communication.

10. The method of claim 9, wherein the parameter rp(1) specifies a limit to a number of time-division multiplexed H-ARQ channels on which data packets will be communicated between the AT and the BS on at least one of the n carriers.

11. The method of claim 10, wherein rp(1) specifies a limit to the number of time-division multiplexed H-ARQ data channels that will be received by the AT on each of the n carriers.

12. The method of claim 7, wherein the limited resource is buffer memory.

13. A transceiver operable as a CDMA Access Terminal (AT) to concurrently receive data packets from a Base Station (BS) via a number n>1 of different carriers occupying substantially non-overlapping frequency bands, comprising when operating:
   a) a reception parameter rp that affects a maximum rate of data communication between the AT and the BS on at least one carrier, and which is settable to any one of a plurality of selectable values;
   b) a data processing resource needed, in a quantity that is a function of n and rp, for data communication between the AT and the BS; and
   c) a resource balancing module configured to accept as an input a selected value for one of n and rp, and to determine a value for the other of n and rp, such that data packets are communicated between the AT and the BS using the determined values of n and rp without requiring more of the data processing resource than is available within the AT.

14. The transceiver of claim 13, further comprising a messaging module that is configured to communicate the determined values of n and rp to the BS.

15. The transceiver of claim 14, wherein the data processing resource is buffer memory, and rp specifies one or more of a maximum coding rate, a maximum-rate modulation scheme, and a number of interlaced H-ARQ channels on which data packets are communicated between the AT and the BS for at least one carrier.

16. The transceiver of claim 15, wherein rp specifies the number of interlaced H-ARQ channels on which data packets are communicated between the AT and the BS for at least one of the n carriers.

17. The transceiver of claim 16, wherein rp specifies the number of interlaced H-ARQ channels on which data packets may be received on each of the n carriers.

* * * * *